(12) United States Patent
Toma et al.

(10) Patent No.: US 7,903,371 B2
(45) Date of Patent: Mar. 8, 2011

(54) PERPENDICULAR MAGNETIC RECORDING HEAD AND PERPENDICULAR MAGNETIC RECORDING/REPRODUCING HEAD HAVING A MAGNETIC SHIELD LAYER WITH A THICK EDGE PORTION

(75) Inventors: Yusuke Toma, Niigata-ken (JP); Hiroshi Kameda, Niigata-ken (JP); Kiyoshi Kobayashi, Niigata-ken (JP); Toru Takahashi, Niigata-ken (JP); Sumihito Morita, Niigata-ken (JP); Toshinori Watanabe, Niigata-ken (JP)

(73) Assignee: TDK Corporation, Tokyo (JP)

( * ) Notice: Subject to any disclaimer, the term of this patent is extended or adjusted under 35 U.S.C. 154(b) by 873 days.

(21) Appl. No.: 11/780,600

(22) Filed: Jul. 20, 2007

(65) Prior Publication Data

US 2008/0019042 A1 Jan. 24, 2008

(30) Foreign Application Priority Data

Jul. 21, 2006 (JP) .................................. 2006-199726
Oct. 30, 2006 (JP) .................................. 2006-293434

(51) Int. Cl.
*G11B 5/147* (2006.01)
*G11B 5/39* (2006.01)
(52) U.S. Cl. .................. 360/125.19; 360/125.3; 360/319
(58) Field of Classification Search ............. 360/125.19, 360/125.2, 125.21, 125.3, 319
See application file for complete search history.

(56) References Cited

U.S. PATENT DOCUMENTS

| 6,809,899 B1* | 10/2004 | Chen et al. ............... 360/125.13 |
| 7,019,944 B2 | 3/2006 | Matono et al. |
| 7,436,628 B2* | 10/2008 | Kameda et al. ............ 360/125.1 |
| 7,518,825 B2* | 4/2009 | Nishida et al. ............ 360/125.2 |
| 7,667,928 B2* | 2/2010 | Hirabayashi et al. .... 360/125.21 |
| 2004/0212923 A1 | 10/2004 | Taguchi |
| 2004/0240108 A1* | 12/2004 | Shukh .......................... 360/125 |
| 2005/0083608 A1 | 4/2005 | Watanabe |
| 2006/0012914 A1 | 1/2006 | Matono |
| 2006/0067006 A1* | 3/2006 | Takagishi et al. ............ 360/319 |
| 2006/0245114 A1* | 11/2006 | Guan et al. .................... 360/319 |

FOREIGN PATENT DOCUMENTS

| JP | 2004/39148 | 2/2004 |
| JP | 2004/326990 | 11/2004 |
| JP | 2006/31774 | 2/2006 |
| JP | 2006-199726 | 8/2006 |
| JP | 2006-293434 | 10/2006 |

OTHER PUBLICATIONS

Search Report for IDS for our case 06-00719.
Notification of Reason for Rejection for Japanese Patent Application 2006-199726, dispatched May 27, 2008, 2 pages.

* cited by examiner

*Primary Examiner* — Jefferson Evans
(74) *Attorney, Agent, or Firm* — Hunton & Williams, LLP (57) ABSTRACT

A perpendicular magnetic recording head includes a first magnetic layer having a main magnetic pole exposed at a medium-facing surface that faces a recording medium; a second magnetic layer that faces the first magnetic layer with a nonmagnetic layer interposed therebetween; and a coil layer for applying a recording magnetic field to the first magnetic layer. The second magnetic layer includes a relatively thick edge portion, whereby the edge-write magnetic field is reduced and the external magnetic field resistance is increased.

5 Claims, 11 Drawing Sheets

LONGITUDINAL DIRECTION

TRACK WIDTH DIRECTION

PERPENDICULAR MAGNETIC RECORDING HEAD AND PERPENDICULAR MAGNETIC RECORDING/REPRODUCING HEAD HAVING A MAGNETIC SHIELD LAYER WITH A THICK EDGE PORTION

CLAIM OF PRIORITY

This application claims benefit of the Japanese Patent Application No. 2006-199726 filed on Jul. 21, 2006 and No. 2006-293434 filed on Oct. 30, 2006, which are hereby incorporated by reference.

BACKGROUND OF THE INVENTION

1. Field of the Invention

The present invention relates to a perpendicular magnetic recording head and a perpendicular magnetic recording/reproducing head that records information on a medium surface of a recording medium by applying a magnetic field in a direction perpendicular to the medium surface.

2. Description of the Related Art

A general perpendicular magnetic recording head has a layered structure including a main magnetic pole layer and a return yoke layer that are arranged so as to face each other with a nonmagnetic insulating layer interposed therebetween along a surface that faces a recording medium (medium-facing surface). The main magnetic pole layer and the return yoke layer are magnetically connected to each other at a position spaced from the medium-facing surface in a height direction. A coil layer for generating a recording magnetic field between the main magnetic pole layer and the return yoke layer is embedded in the nonmagnetic insulating layer. In this type of magnetic recording head, when electricity is applied to the coil layer, a recording magnetic field is induced between the main magnetic pole layer and the return yoke layer. The magnetic flux of the recording magnetic field extends from the medium-facing surface of the main magnetic pole layer, enters a hard layer of the recoding medium in a direction perpendicular thereto, passes through a soft layer of the recording medium, and returns to the return yoke layer. Thus, information is recorded on the recording medium in an area facing the main magnetic pole layer (refer to, for example, U.S. Patent Application Publication No. 2005/0083608(A1)).

On the other hand, a general perpendicular magnetic recording/reproducing head includes a reading unit including a lower shield layer and an upper shield layer. The lower shield layer is formed on a nonmagnetic insulating layer that is provided on a slider, and an upper shield layer is formed so as to face the upper shield layer with an inorganic insulating layer (gap insulating layer) interposed therebetween. A read element is disposed in the inorganic insulating layer.

In the perpendicular magnetic recording head and the perpendicular magnetic recording/reproducing head, the return yoke layer and the shield layers are generally formed of substantially rectangular magnetic thin films. Accordingly, when an external magnetic field is applied in the height direction, the magnetic flux concentrates at the edges of the magnetic films. At this time, of the magnetic field components in the magnetization directions, a component in the height direction becomes the largest, which leads to overwriting of existing information (edge writing). In order to reduce the edge-write magnetic field, it is necessary to reduce the magnetic field component in the height direction that are generated at the edges of the return yoke layer and the shield layers.

SUMMARY OF THE INVENTION

Exemplary embodiments of the present invention provide a perpendicular magnetic recording head or a perpendicular magnetic recording/reproducing head that can reduce the edge-write magnetic field so as to increase external magnetic field resistance.

According to one aspect of the present invention, a perpendicular magnetic recording head includes a first magnetic layer having a main magnetic pole exposed at a medium-facing surface that faces a recording medium; a second magnetic layer that faces the first magnetic layer with a nonmagnetic layer interposed therebetween; and a coil layer for applying a recording magnetic field to the first magnetic layer. The second magnetic layer includes a relatively thick edge portion.

According to this structure, since the second magnetic layer includes the relatively thick edge portion, the area in which the edge portion is exposed at the medium-facing surface thereof is relatively large. Therefore, at the edge portion, a magnetic flux density is reduced in an area near the edge and the strength of the magnetic field generated at the edge portion is reduced accordingly. As a result, even when the second magnetic layer is relatively thin, the edge-write magnetic field can be reduced and the external magnetic field resistance can be increased.

In the perpendicular magnetic recording head according to embodiments of the present invention, the edge portion may be positioned to be exposed at the medium-facing surface. In addition, a length of the edge portion in a track width direction is in the range of approximately 4 μm to 10 μm.

According to another aspect of the present invention, a perpendicular magnetic recording/reproducing head includes a read element exposed at a medium-facing surface that faces a recording medium; a pair of shield layers that shield the read element; a magnetic layer having a main magnetic pole exposed at the medium-facing surface that faces the recording medium; a return yoke layer that faces the magnetic layer with a nonmagnetic layer interposed therebetween; and a coil layer for applying a recording magnetic field to the magnetic layer and the return yoke layer. At least one of the pair of shield layers includes a relatively thick edge portion.

According to this structure, since at least one of the pair of shield layers includes the relatively thick edge portion, the area in which the edge portion is exposed at the medium-facing surface is relatively large. Therefore, at the edge portion, a magnetic flux density is reduced in an area near the edge and the strength of the magnetic field generated at the edge portion is reduced accordingly. As a result, even when the shield layers are relatively thin, the edge-write magnetic field can be reduced and the external magnetic field resistance can be increased.

In the perpendicular magnetic recording/reproducing head according to embodiments of the present invention, each of the pair of shield layers may include the edge portion, the edge portion protruding in a direction away from an insulating layer in a cross section along a height direction.

In addition, in the perpendicular magnetic recording/reproducing head according to embodiments of the present invention, the edge portion may be positioned to be exposed at the medium-facing surface. In addition, a length of the edge portion in a track width direction may be in the range of approximately 4 μm to 10 μm.

As described above, the perpendicular magnetic recording head according to the embodiments of invention includes a first magnetic layer having a main magnetic pole exposed at a medium-facing surface that faces a recording medium; a second magnetic layer that faces the first magnetic layer with a nonmagnetic layer interposed therebetween; and a coil layer for applying a recording magnetic field to the first magnetic layer, and the second magnetic layer includes a relatively thick edge portion. Accordingly, the edge-write magnetic field can be reduced and the external magnetic field resistance can be increased.

In addition, the perpendicular magnetic recording/reproducing head according to embodiments of the present invention includes a read element exposed at a medium-facing surface that faces a recording medium; a pair of shield layers that shield the read element; a magnetic layer having a main magnetic pole exposed at the medium-facing surface that faces the recording medium; a return yoke layer that faces the magnetic layer with a nonmagnetic layer interposed therebetween; and a coil layer for applying a recording magnetic field to the magnetic layer and the return yoke layer, and at least one of the pair of shield layers includes a relatively thick edge portion. Accordingly, the edge-write magnetic field can be reduced and the external magnetic field resistance can be increased.

DESCRIPTION OF THE EXEMPLARY EMBODIMENTS

Exemplary embodiments are discussed in detail below. While specific exemplary embodiments are discussed, it should be understood that this is done for illustration purposes only. A person skilled in the relevant art will recognize that other components and configuration can be used without departing from the spirit and scope of the claimed inventions.

Exemplary embodiments of the present invention will be described below with reference to the accompanying drawings.

In an exemplary embodiment, a case in which the second magnetic layer is a return yoke layer will be described.

In a perpendicular magnetic recording head, when the inner temperature is increased during an information recording process, a so-called Pole-Tip Protrusion (PTP) phenomenon occurs in which the return yoke layer easily protrudes from a medium-facing surface due to the difference in coefficient of thermal expansion between the material of the return yoke layer and an insulating material surrounding the return yoke layer.

This PTP phenomenon can be suppressed by reducing the thickness of the return yoke layer. However, if the thickness of the return yoke layer is uniformly reduced to suppress the PTP phenomenon, the area of the return yoke layer that is exposed at the medium-facing surface is reduced and the return yoke layer is easily magnetized in the height direction. Therefore, the strength of the magnetic field component in the height direction is increased and there is a risk that edge writing will occur. Accordingly, it is advantageous to suppress the PTP phenomenon while reducing the edge-write magnetic field to increase the external magnetic field resistance.

Accordingly, exemplary embodiments of the present invention provide a perpendicular magnetic recording head including a magnetic layer having a main magnetic pole exposed at a medium-facing surface that faces a recording medium; a return yoke layer that faces the magnetic layer with a nonmagnetic layer interposed therebetween; and a coil layer for applying a recording magnetic field to the magnetic layer, the return yoke layer including a relatively thick edge portion. Therefore, the PTP phenomenon can be suppressed and the edge-write magnetic field is reduced so that external magnetic field resistance is increased.

Figure 1:
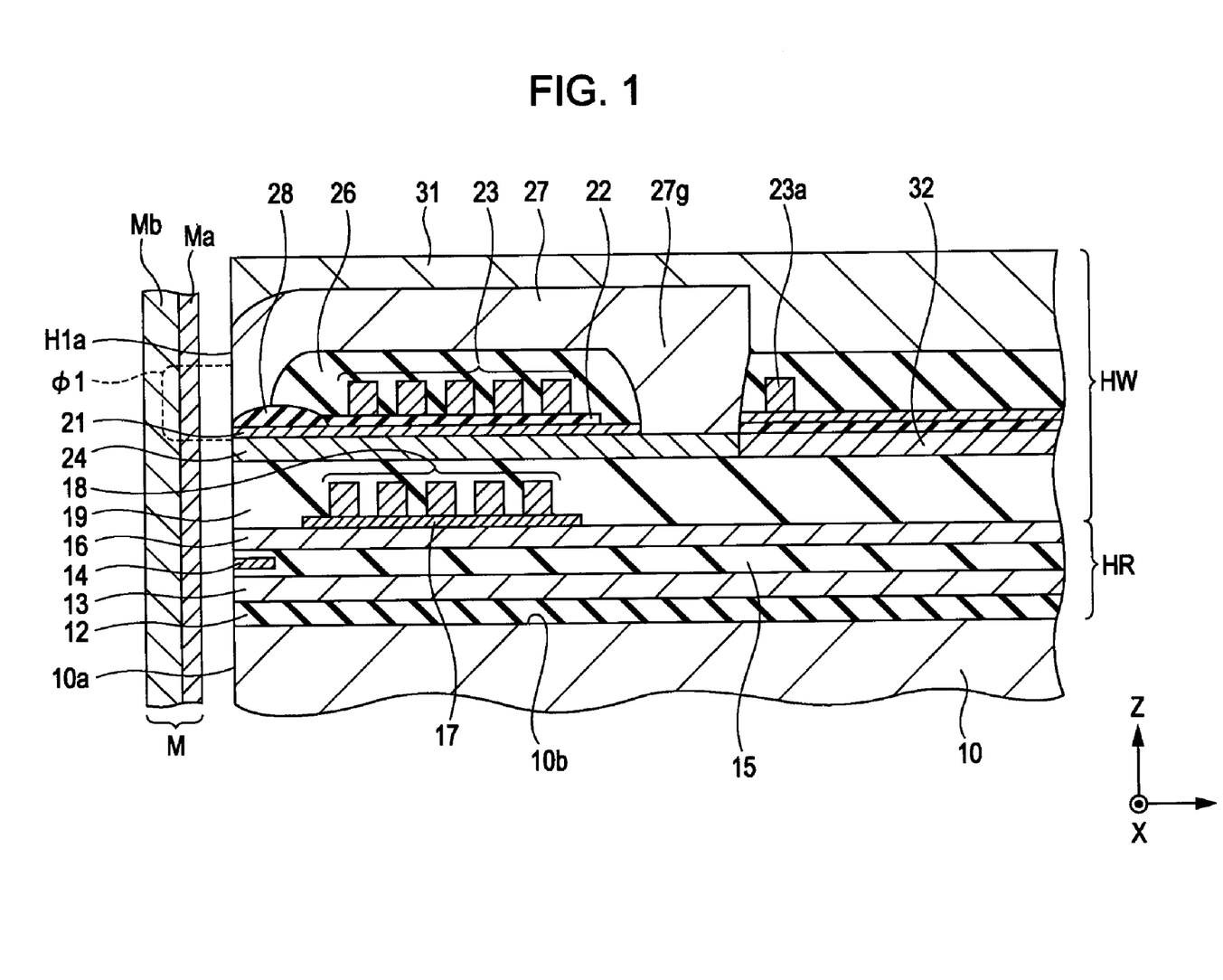
FIG. 1 is a vertical sectional view illustrating a magnetic head apparatus including a perpendicular magnetic recording head according to an embodiment of the present invention.
Figure 2:
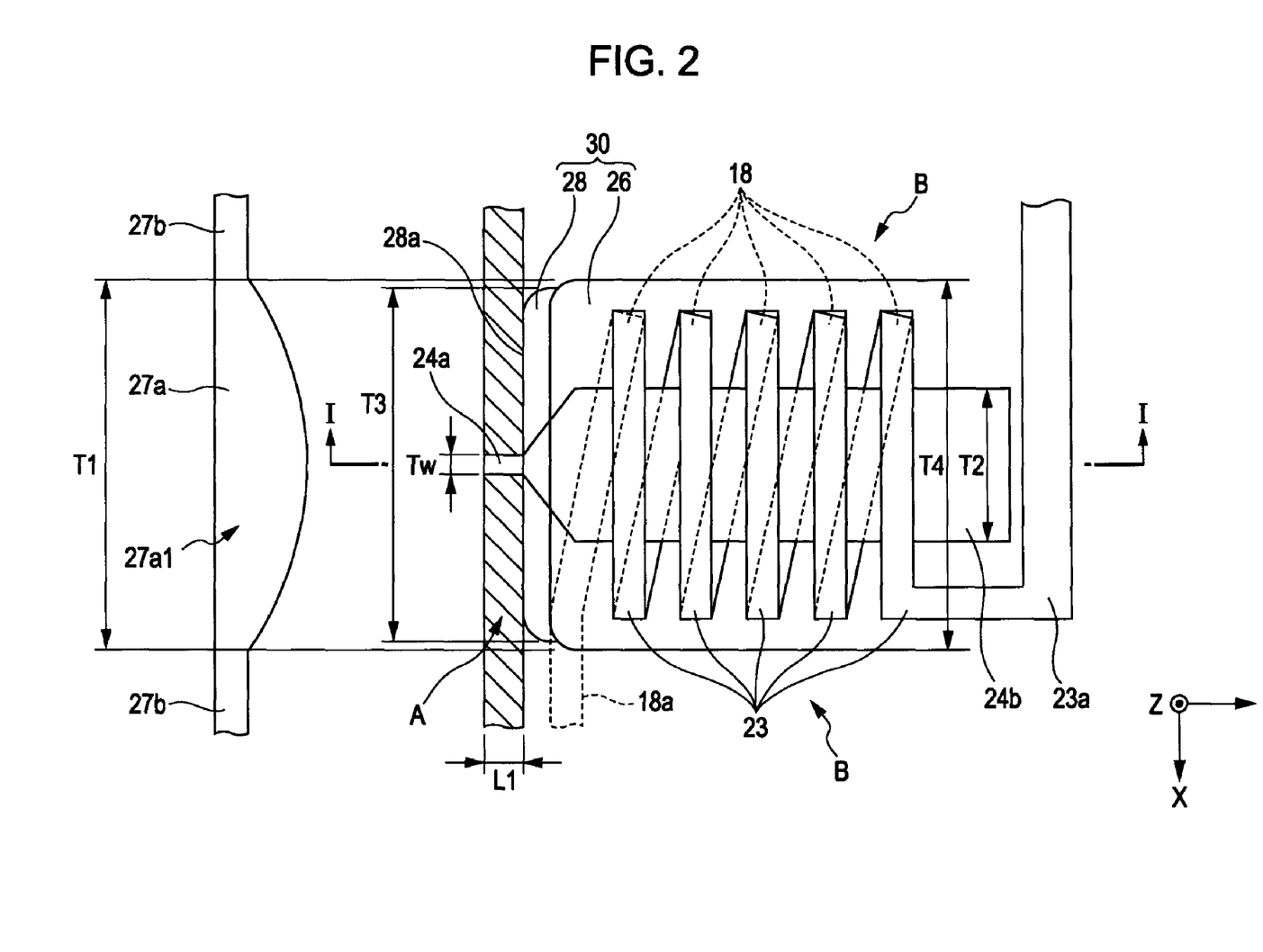
FIG. 2 shows a partial plan view of the perpendicular magnetic recording head shown in FIG. 1 and a partial front view of a return yoke layer.

FIG. 1 is a vertical sectional view illustrating a magnetic head apparatus including a perpendicular magnetic recording head according to an embodiment of the present invention. FIG. 2 shows a partial plan view of the perpendicular magnetic recording head shown in FIG. 1 and a partial front view of a return yoke layer. In FIG. 1, the X direction indicates a track-width direction, the Y direction indicates the height direction, and the Z direction indicates a film-thickness direction. Each of the X, Y, and Z directions is perpendicular to the other two directions.

A perpendicular magnetic recording head HW shown in FIG. 1 applies a perpendicular magnetic field to a recording medium M, thereby magnetizing a hard layer Ma in the recording medium M in a direction perpendicular thereto. The recording medium M is, for example, disc-shaped and has a hard layer Ma with high residual magnetization on the surface thereof and a soft layer Mb with high magnetic permeability under the hard layer Ma. The recording medium M rotates about the center thereof.

The slider 10 is made of a nonmagnetic material, such as $Al_2O_3$·TiC. The slider 10 has a medium-facing surface 10a that faces the recording medium M. When the recording medium M rotates, the slider 10 flies above the surface of the recording medium M due to an airflow on the surface, or slides along the recording medium M. A nonmagnetic insulating layer 12 made of an inorganic material, such as $Al_2O_3$ and $SiO_2$, is formed on a trailing end surface (top surface) 10b of the slider 10, and a reading unit HR is provided on the nonmagnetic insulating layer 12.

The reading unit HR includes a lower shield layer 13 formed on the nonmagnetic insulating layer 12 and an upper shield layer 16 formed so as to face the lower shield layer 13 with an inorganic insulating layer (gap insulating layer) 15 interposed therebetween. A read element 14 is embedded in the inorganic insulating layer 15. The read element 14 is a magnetoresistive element, such as an Anisotropic Magnetoresistance (AMR) element, a Giant Magnetoresistance GMR) element, and a Tunnel Magnetoresistance (TMR) element.

A coil insulating base layer 17 is formed on the upper shield layer 16, and a plurality of lower coil pieces 18 are formed on the coil insulating base layer 17. The lower coil pieces 18 are made of at least one metal material selected from Au, Ag, Pt, Cu, Cr, Al, Ti, NiP, Mo, Pd, Rh, and Ni. The lower coil pieces 18 may also be formed by laminating layers of the above-mentioned nonmagnetic metal materials.

The lower coil pieces 18 are surrounded by a coil insulating layer 19 made of an inorganic insulating material, such as $Al_2O_3$, or an organic insulating material, such as resist. The top surface of the coil insulating layer 19 is flat, and a seed layer (not shown) is formed on the top surface of the coil insulating layer 19. A main magnetic pole layer 24 is provided on the seed layer. The main magnetic pole layer 24 is surrounded by an insulating layer 32 made of $Al_2O_3$, $SiO_2$, etc., and the top surfaces of the main magnetic pole layer 24 and the insulating layer 32 are subjected to a planarizing process so that they flush with each other. The main magnetic pole layer 24 is formed of, for example, a ferromagnetic material, such as NiFe, CoFe, and NiFeCo that has a high saturation magnetic flux density by plating.

As shown in FIG. 2, the main magnetic pole layer 24 includes an elongate front portion 24a and a rear portion 24b positioned behind the front portion 24a in the height direction (Y direction in FIG. 2). The front portion 24a has a track width Tw and extends in the height direction from a medium-facing surface H1a that faces the recording medium M (the medium-facing surface H1a substantially flushes with the medium-facing surface 10a of the slider 10). The rear portion 24b is wider than the front portion 24a in the track width direction (X direction in FIG. 2) and has a maximum width of T2.

As shown in FIG. 1, a nonmagnetic gap layer 21 made of an inorganic material, such as $Al_2O_3$ and $SiO_2$, is formed on the main magnetic pole layer 24. A coil insulating base layer 22 is formed on the gap layer 21, and a plurality of upper coil pieces 23 are formed on the coil insulating base layer 22. Since the gap layer 21 also functions as an insulating base layer for the upper coil pieces 23, the coil insulating base layer 22 may be omitted. Similar to the lower coil pieces 18, the upper coil pieces 23 are also formed of a conductive material. For example, the upper coil pieces 23 are made of at least one metal material selected from Au, Ag, Pt, Cu, Cr, Al, Ti, NiP, Mo, Pd, Rh, and Ni. The upper coil pieces 23 may also be formed by laminating layers made of the above-mentioned nonmagnetic metal materials.

As shown in FIG. 2, the lower coil pieces 18 and the upper coil pieces 23 are arranged in a solenoid shape, and are electrically connected to each other at the ends thereof in the track width direction (X direction in FIG. 2). The lower coil pieces 18 and the upper coil pieces 23 have lead portions 18a and 23a, respectively, through which electricity is supplied to the solenoidal coil.

A coil insulating layer 26 made of an inorganic insulating material, such as $Al_2O_3$, or an organic insulating material, such as resist, is formed on the upper coil pieces 23. In addition, in the present embodiment, a gap-adjusting insulating layer 28 made of an inorganic or organic material is formed on the gap layer 21. The front edge of the coil insulating layer 26 is positioned on the gap-adjusting insulating layer 28. As shown in FIG. 2, a front edge 28a of the gap-adjusting insulating layer 28 linearly extends in a direction substantially parallel to the track width direction (X direction in FIG. 2). The front edge 28a of the gap-adjusting insulating layer 28 is separated from the medium-facing surface H1a by a predetermined distance (gap depth) L1 in the height direction. As shown in FIG. 2, the gap-adjusting insulating layer 28 extends in the track width direction (X direction in FIG. 2). The width T3 of the front edge 28a of the gap-adjusting insulating layer 28 is larger than at least the maximum width T2 of the main magnetic pole layer 24.

Since the solenoidal coil is used, the width of the upper coil pieces 23 in the track width direction is always larger than the maximum width T2 of the main magnetic pole layer 24. Therefore, the maximum width T4 of the coil insulating layer 26 that covers the upper coil pieces 23 is always larger than the maximum width T2 of the main magnetic pole layer 24. The gap-adjusting insulating layer 28 is formed of, for example, an organic insulating material by a thermosetting process. Due to the thermosetting process, the vertical cross section of the gap-adjusting insulating layer 28 changes from a rectangular shape to a substantially semi-elliptical shape (alternatively, at least a top surface 28b of the gap-adjusting insulating layer 28 is changed to a curved surface). The coil insulating layer 26, which overlaps the gap-adjusting insulating layer 28 and extends in the height direction, is also formed of an organic insulating material by a thermosetting process. Accordingly, in an area adjacent to the medium-facing surface, a top surface 26b of the coil insulating layer 26 is convex upward and extends from the top surface 28b of the gap-adjusting insulating layer 28. When the top surface of the gap layer 21 is defined as a reference plane, the gap-adjusting insulating layer 28 and the coil insulating layer 26 (the combination of these layers is sometimes referred to as an "insulating layer 30" in the following description) protrude upward (in the Z direction in FIGS. 1 to 3) from the reference plane. The top surface of the gap layer 21 is exposed in an area surrounding the insulating layer 30. In the following description, an area between the front edge 28a of the gap-adjusting insulating layer 28 and the medium-facing surface H1a is referred to as a front area A (shaded area in FIG. 2) and areas on both sides of the insulating layer 30 in the track width direction (X direction in FIG. 2) are referred to as side areas B.

As shown in FIGS. 1 and 2, a return yoke layer 27, which is made of a magnetic material, such as Permalloy, and functions as the second magnetic layer, is formed on the front area A, the insulating layer 30, and the side areas B. As shown in FIG. 1, the return yoke layer 27 has a connecting portion 27g that is magnetically connected to the main magnetic pole layer 24 at a rear end thereof in the height direction. The return yoke layer 27 is covered with a protecting layer 31 made of an inorganic insulating material or the like. The second magnetic layer may also be provided as a magnetic layer that only has a shielding effect and that is not magnetically connected with the magnetic layer including the main magnetic pole.

Figure 3:
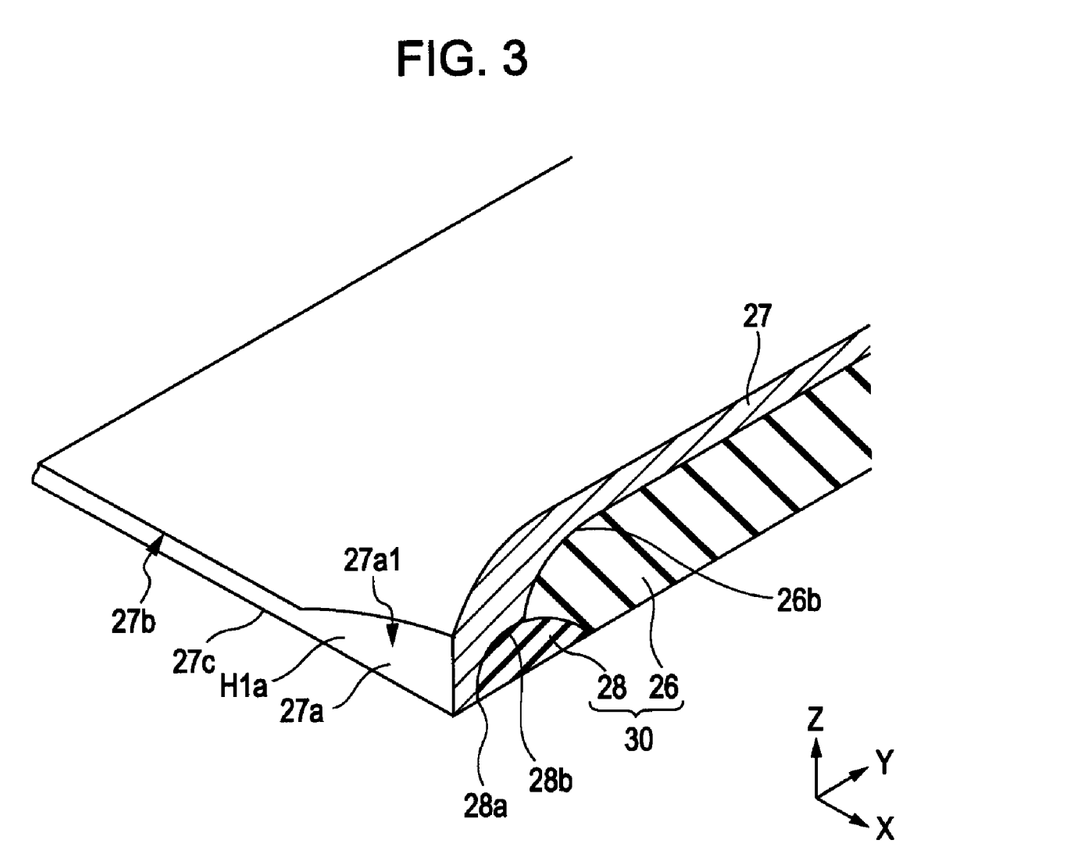
FIG. 3 is a partially sectioned perspective view of the perpendicular magnetic recording head shown in FIG. 1.

The return yoke layer 27 includes a central portion 27a and side portions 27b positioned on either side of the central portion 27a in the track width direction (X direction in FIGS. 1 to 3). The central portion 27a is positioned so as to face the main magnetic pole layer 24 in the film-thickness direction (Z direction in FIGS. 1 to 3). As shown in FIGS. 1 and 2, the central portion 27a has a protrusion 27a1 that protrudes upward over an area covering the insulating layer 30 and the front area A. Since the insulating layer 30 protrudes from the side areas B, a portion of the return yoke layer 27 provided on the insulating layer 30 protrudes, of course, from portions of the return yoke layer 27 provided on the side areas B. The thickness of the portion of the return yoke layer 27 provided on the insulating layer 30 does not largely differ from the thickness of the portions of the return yoke layer 27 provided on the side areas B. To suppress the PTP phenomenon, the thickness of the return yoke layer 27 may be in the range of approximately 0.1 μm to 1.0 μm.

Since the top surface of the front area A is flat as described above, the bottom surface of the return yoke layer 27 is flat in the front area A, as shown in FIG. 3. In addition, in the medium-facing surface H1a, a bottom edge 27c of the return yoke layer 27 linearly extends in a direction perpendicular to the track width direction (X direction in FIG. 3). The return yoke layer 27 is substantially rectangular in plan view. In addition, as shown in FIG. 2, the width T4 of the return yoke layer 27 in the medium-facing surface H1a is sufficiently larger than the track width Tw of the main magnetic pole layer 24 in the track width direction.

Figure 4A:
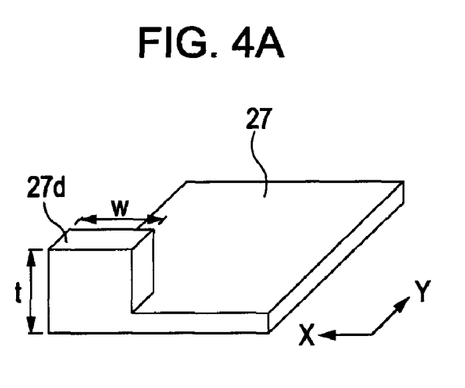
FIGS. 4A and 4B are diagrams illustrating examples of the shapes of the return yoke layer.
Figure 4B:
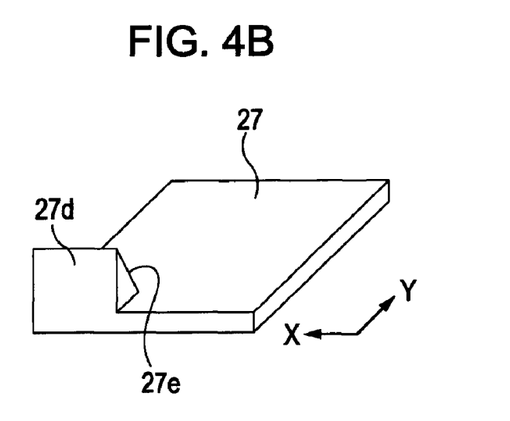
Figure 5:
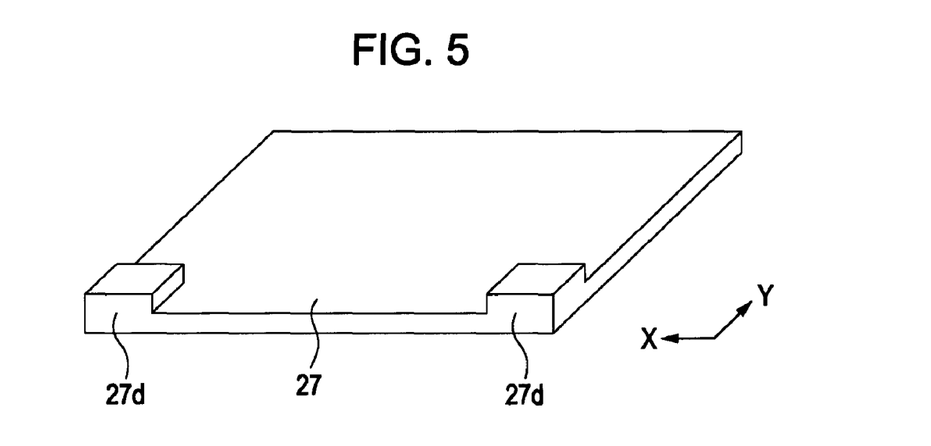
FIG. 5 is a diagram illustrating another example of the shape of the return yoke layer.

The return yoke layer 27 has a relatively thick edge portion. The edge portion may be shaped as shown in FIGS. 4A, 4B, and 5. For example, the edge portion may be a block-shaped thick portion 27d, as shown in FIG. 4A. Alternatively, as shown in FIG. 4B, the edge portion may be a thick portion 27d having a surface that is inclined inward in the height direction (toward the inside from the medium-facing surface). More specifically, the thick portion 27d may have a slope 27e such that the thickness of the thick portion 27d is reduced toward the inside in the height direction.

When an external magnetic field is applied to the magnetic head apparatus in a planar direction (height direction), the magnetic layers are magnetized and generate magnetic fields at edges thereof. At this time, the return yoke and the lower shield layer generate the largest magnetic field (planar-direction component) at the edges thereof. This leads to a phenomenon in which overwriting occurs and existing information is deleted (edge writing). The magnetic fields generated at the edges can be reduced by increasing the volumes around the edges and reducing the magnetic flux density around the edges, and have made the embodiments of present invention based on this discovery.

According to embodiments of the present invention, the edge portion of the return yoke layer may be shaped such that the volume of the return yoke layer is increased at the edge portion. For example, the edge portion has a relatively large thickness. Accordingly, the magnetic flux density around the edge is reduced, so that the edge-write magnetic field is suppressed and the external magnetic field resistance is increased.

In the following description, simulations performed to clarify the effects of the embodiments of present invention will be explained.

Figure 6:
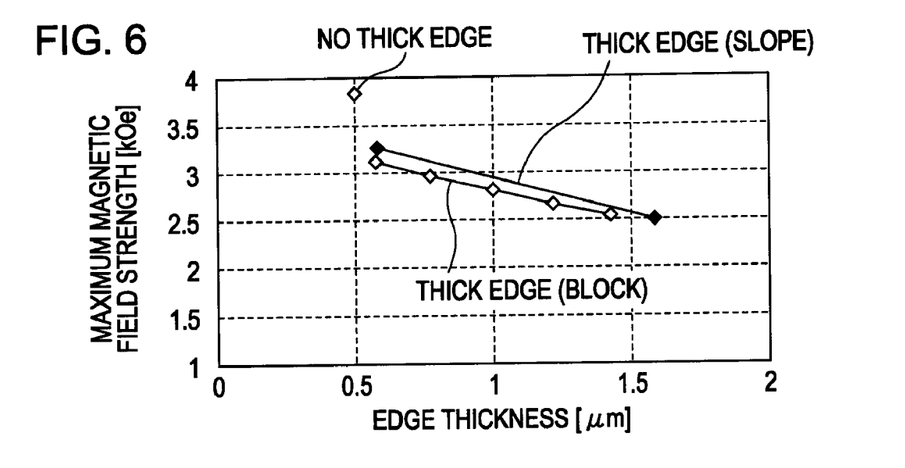
FIG. 6 is a diagram illustrating the characteristic of the perpendicular magnetic recording head according to an embodiment of the present invention.

A static magnetic field simulation was performed to confirm the effects of the embodiments of the present invention. In this simulation, parts relating to the external magnetic field resistance in the perpendicular magnetic recording head were modeled and magnetization states thereof under the application of external magnetic field were calculated. A maximum value in a magnetic field strength distribution of the magnetic field component in the height direction was determined as the maximum magnetic field strength. The magnetic field strength distribution of the magnetic field component in the height direction was measured at a plane that passes through the thickness center of the recording magnetic film. The maximum magnetic field strength obtained in the magnetic head apparatus including the perpendicular magnetic recording head was determined for the case in which the thickness of the edge portion of the return yoke layer was 0.6 μm. The result is shown in FIG. 6. In addition, the maximum magnetic field strength obtained in the magnetic head apparatus was also determined for the cases in which the thickness of the edge portion of the return yoke layer (t in FIG. 4A) was varied (0.8 μm, 1 μm, 1.2 μm, and 1.4 μm). The results of these simulations are also shown in FIG. 6. In the above-mentioned simulations, it is assumed that the edge portion has a block shape, as shown in FIG. 4A.

In addition, similarly, the maximum magnetic field strength obtained in the magnetic head apparatus including the perpendicular magnetic recording head was determined for the case in which the edge portion of the return yoke layer was slope shaped, as shown in FIG. 4B and the thickness thereof is 0.6 μm. The result is also shown in FIG. 6. In addition, the maximum magnetic field strength obtained in the magnetic head apparatus was also determined for the case in which the thickness of the slope-shaped edge portion of the return yoke layer was 1.6 μm. The result of this simulation is also shown in FIG. 6.

For comparison, the maximum magnetic field strength obtained in a magnetic head apparatus including a perpendicular magnetic recording head having a return yoke layer with a uniform thickness of 0.5 μm was also determined by a similar method. The result of this simulation is also shown in FIG. 6.

As is clear from FIG. 6, in the magnetic head apparatus including the perpendicular magnetic recording head according to an embodiment of the present invention, since the edge portion is relatively thick, the maximum magnetic field strength is less than 3.5 kOe ($\times 10^3/4$ πA/m). Thus, the edge-write magnetic field is suppressed and the external magnetic field resistance is increased. The external magnetic field resistance is increased as the thickness of the edge portion is increased. The reasons for this can be considered as follows. That is, as the thickness of the edge portion is relatively increased, the number of edge points (poles) is increased, so that the number of magnetization concentration points is increased. In addition, the magnetization concentration portions are dispersed inward in the height direction, and the area of the return yoke layer exposed at the medium-facing surface is increased. As a result, the density of the magnetic flux in the height direction that concentrates at the edge portion is reduced. Therefore, the edge portion may be provided at a position where the edge portion is exposed at the medium-facing surface.

In comparison, in the magnetic head apparatus including the perpendicular magnetic recording head in which the return yoke layer is free from the relatively thick edge portion, the maximum magnetic field strength is about 4 kOe ($\times 10^3/4\pi$ A/m). Therefore, edge writing occurs depending on the coercive force of the medium on which information is recorded.

Figure 7:
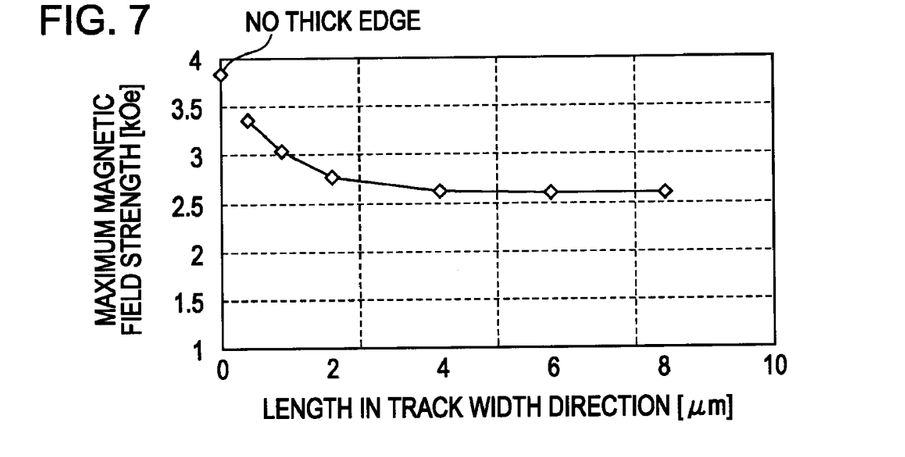
FIG. 7 is another diagram illustrating the characteristic of the perpendicular magnetic recording head according to an embodiment of the present invention.

The maximum magnetic field strength was also determined for the cases in which the length of the relatively thick edge portion in the track width direction (w in FIG. 4A) was varied (0.5 µm, 1 µm, 2 µm, 4 µm, 6 µm, and 8 µm). The results are shown in FIG. 7. For comparison, the maximum magnetic field strength in a magnetic head apparatus including a perpendicular magnetic recording head having a return yoke layer with a uniform thickness of 0.5 µm was also determined by a similar method. The result of this simulation is also shown in FIG. 7.

As is clear from FIG. 7, the maximum magnetic field strength is high when the length w of the thick portion in the track width direction is small. When the length w is equal to or more than a certain length, the maximum magnetic field strength is at a lower limit. Accordingly, it can be determined from FIG. 7 that the length of the edge portion in the track width direction may be in the range of approximately 4 µm to 10 µm. The maximum magnetic field strength does not vary in accordance with the length of the relatively thick edge portion in the height direction. Therefore, the length of the edge portion in the height direction is not particularly limited.

From the viewpoint of the PTP phenomenon, a thermal analysis simulation was performed for determining an amount of projection of an element that projects from the medium-facing surface due to heat in the magnetic head apparatus including the magnetic recording head according to embodiments of the present invention. The amount of projection of the element was measured at a central position in the track width direction near the main magnetic pole and at an edge position near the thick portion. The amount of projection of the element in the magnetic head apparatus including the perpendicular magnetic recording head was determined for the cases in which the thickness of the edge portion of the return yoke layer was 0.6 µm and the length of the thick portion in the track width direction (w in FIG. 4A) was varied (1 µm, 3 µm, 5 µm, 10 µm, 20 µm, and 28 µm). The results are shown in FIG. 8.

Figure 8:
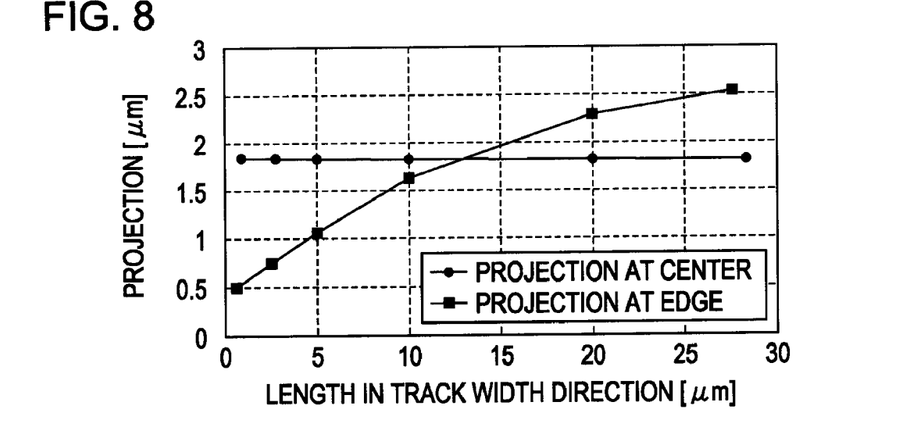
FIG. 8 is a diagram illustrating the relationship between the length of a thick portion and the amount of projection of an element.

As is clear from FIG. 8, as the length w of the thick portion is increased, the amount of projection at the edge portion is increased. However, the amount of projection of the element at the central position is constant irrespective of the length w of the thick portion in the track width direction, and the influence of the length w of the thick portion is small. It is clear from the tendency of the graph shown in FIG. 8 that, in a magnetic head apparatus that is free from the thick portion, the amount of projection is largest at the central position in the track width direction. Accordingly, the length w of the thick portion may be approximately 10 µm or less, so that the amount of projection at the edge position does not exceed the amount of projection at the central position.

A method for manufacturing the perpendicular magnetic recording head having the above-described return yoke layer will be described below. FIGS. 9A to 9D are diagrams illustrating a method for manufacturing the perpendicular magnetic recording head according to embodiments of the present invention. FIGS. 9A to 9D show views of the medium-facing surface, and sectional views taken along line C-C are additionally shown in FIGS. 9B to 9D.

Figure 9A:
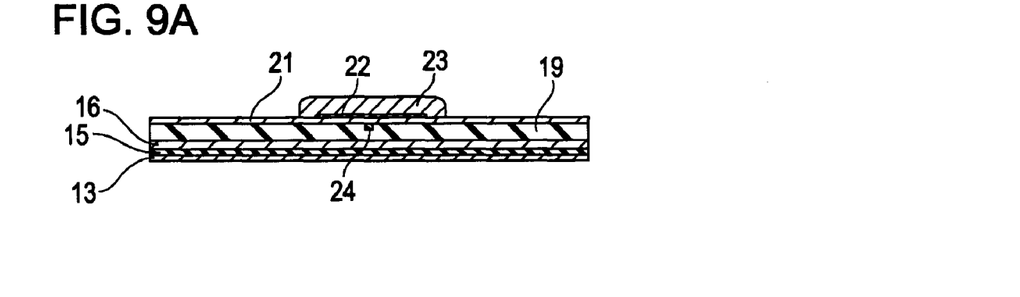
FIGS. 9A to 9D are diagrams illustrating a method for manufacturing the perpendicular magnetic recording head according to embodiments of the present invention.

The nonmagnetic insulating layer 12, the lower shield layer 13, the inorganic insulating layer 15, and the upper shield layer 16 are formed on the slider 10, and the insulating layer 19 including the main magnetic pole layer 24 is formed on the upper shield layer 16. The gap layer 21 is formed on the insulating layer 19, and the coil insulating base layer 22 is formed on the gap layer 21 in a predetermined pattern. Then, the upper coil pieces 23 are formed on the coil insulating base layer 22. Thus, the structure shown in FIG. 9A is obtained. In the processes for forming the structure shown in FIG. 9A, known conditions and materials may be used.

Figure 9B:
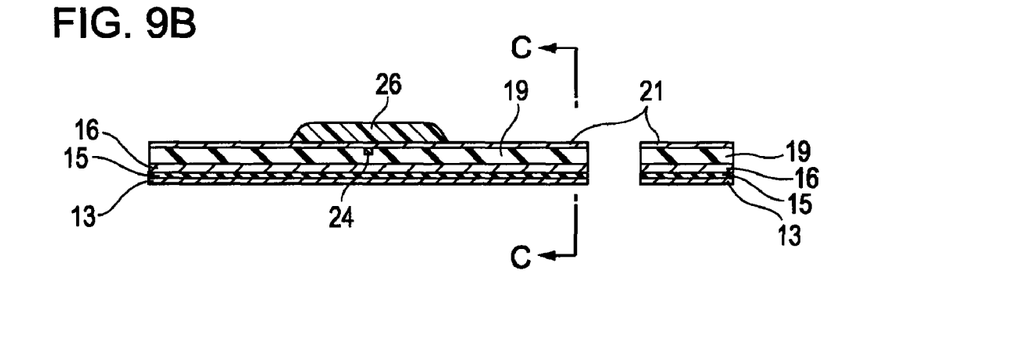

Next, as shown in FIG. 9B, a resist layer 26 is formed on the gap layer 21 on which the coil insulating base layer 22 and the upper coil pieces 23 are formed. More specifically, a resist material is applied so as to cover the gap layer 21 on which the coil insulating base layer 22 and the upper coil pieces 23 are formed, is exposed through a mask having an opening in a region where the resist layer 26 is to be formed, and is then developed. Thus, the resist layer 26 is formed.

Figure 9C:
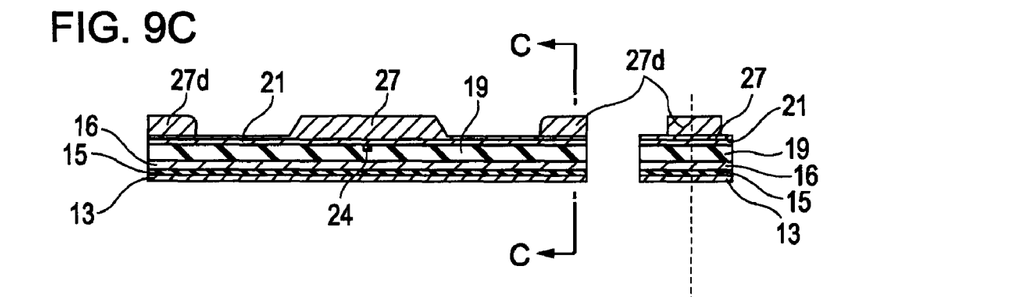
Figure 9D:
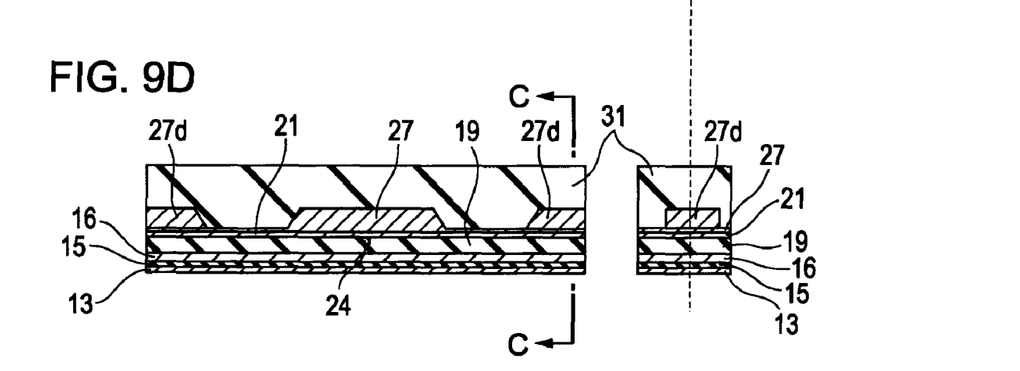

Next, as shown in FIG. 9C, the return yoke layer 27 is formed on the resist layer 26, which functions as a coil insulating layer. The return yoke layer 27 is formed on the resist layer 26 by plating. Then, the thick portion 27d is formed at each of the edges of the return yoke layer 27. The thick portions 27d are formed by performing additional plating at only the edges of the return yoke layer 27. Accordingly, relatively thick portions are provided. Then, as shown in FIG. 9D, the insulating layer 31 is formed on the return yoke layer 27.

Thus, the perpendicular magnetic recording head including the return yoke layer 27 having relatively thick edge portions is manufactured. As is clear from the sectional view taken along line C-C in FIG. 9C, the edge portions have relatively large exposed areas at the medium-facing surface. Since the edge portions are provided, the magnetic flux density in areas around the edges is reduced, so that the magnetic field strength is reduced at the edge portions. Therefore, even when the return yoke layer 27 is relatively thin, the edge-write magnetic field is suppressed and the external magnetic field resistance is increased.

Figure 10A:
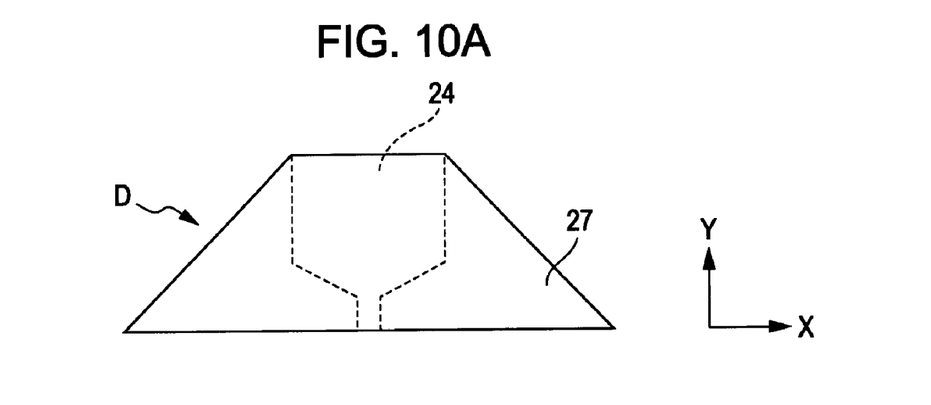
FIGS. 10A to 10C are diagrams illustrating other examples of return yoke layers in the perpendicular magnetic recording head according to an embodiment of the present invention.
Figure 10B:
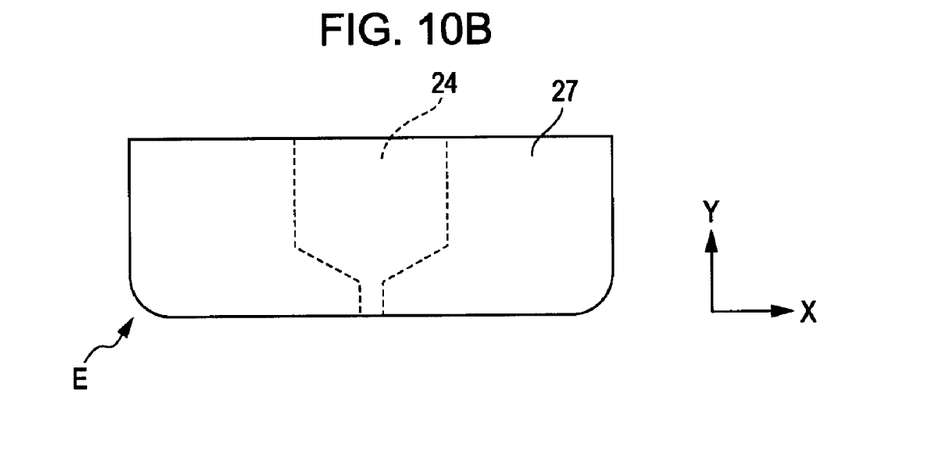
Figure 10C:
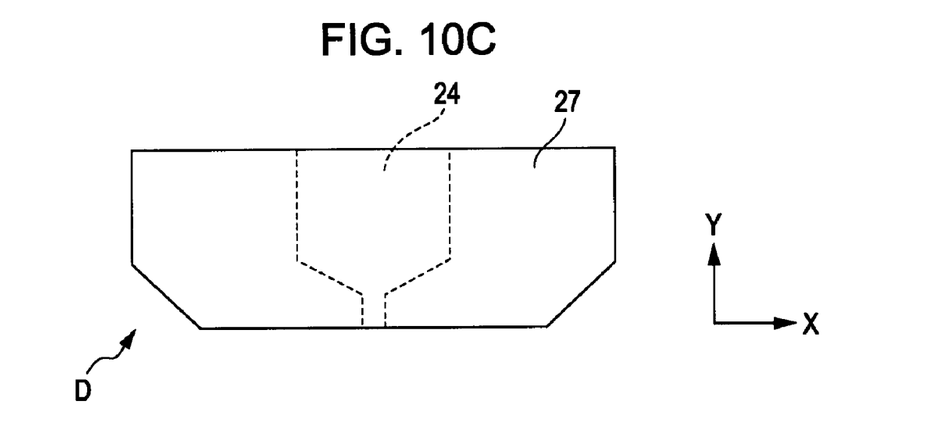

According to embodiments of the present invention, various modifications can be made in the perpendicular magnetic recording head. For example, as shown in FIG. 10A, the shape of the rear edge (the inner edge with respect to the medium-facing surface) of the return yoke layer 27 may be changed. More specifically, for example, tapered surfaces D may be provided on the rear edge of the return yoke layer 27 such that the width thereof is reduced toward the inside. Alternatively, as shown in FIG. 10B, the return yoke layer 27 may have a curved surface E at the edge adjacent to the medium-facing surface. Alternatively, as shown in FIG. 10C, the return yoke layer 27 may have tapered surfaces D on the edge adjacent to the medium-facing surface, so that the width of the return yoke layer 27 is increased toward the inside. Also in these cases, the edge-write magnetic field can be suppressed and the external magnetic field resistance can be increased.

In a perpendicular magnetic recording/reproducing head, when the inner temperature is increased during an information recording process, a so-called Pole-Tip Protrusion (PTP) phenomenon occurs in which shield layers easily protrude from a medium-facing surface due to the difference in coefficient of thermal expansion between the material of the shield layers and an insulating material surrounding the shield layers.

The PTP phenomenon can be suppressed by reducing the thickness of the shield layers. However, if the thickness of the shield layers is uniformly reduced to suppress the PTP phenomenon, the areas of the shield layers that are exposed at the medium-facing surface are reduced and the shield layers are easily magnetized in the height direction. Therefore, the strength of the magnetic field component in the height direction is increased and there is a risk that edge writing will occur. Accordingly, it is advantageous to suppress the PTP phenomenon while reducing the edge-write magnetic field to increase the external magnetic field resistance.

Accordingly, exemplary embodiments of the present invention provide a perpendicular magnetic recording/reproducing head including a read element exposed at a medium-facing surface that faces a recording medium; a pair of shield layers that shield the read element; a magnetic layer having a main magnetic pole exposed at the medium-facing surface that faces the recording medium; a return yoke layer that faces the magnetic layer with a nonmagnetic layer interposed therebetween; and a coil layer for applying a recording magnetic field to the magnetic layer and the return yoke layer, at least one of the pair of shield layers including a relatively thick edge portion. Therefore, the PTP phenomenon can be suppressed and the edge-write magnetic field is reduced so that external magnetic field resistance is increased.

As described above, FIG. 1 is a vertical sectional view illustrating a magnetic head apparatus including a perpendicular magnetic recording/reproducing head according to an embodiment of the present invention. FIG. 2 shows a partial plan view of the perpendicular magnetic recording/reproducing head shown in FIG. 1 and a partial front view of a return yoke layer. In FIG. 1, the X direction indicates a track-width direction, the Y direction indicates the height direction, and the Z direction indicates a film-thickness direction. Each of the X, Y, and Z directions is perpendicular to the other two directions. Explanations of FIGS. 1 and 2 are similar to those provided in the first embodiment, and are therefore omitted here.

Figure 11A:
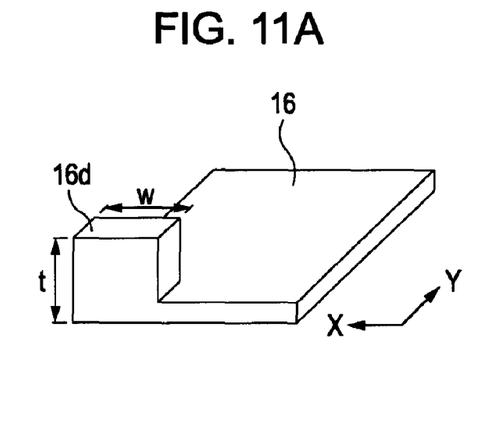
FIGS. 11A and 11B are diagrams illustrating examples of the shapes of shield layers according to an embodiment of the present invention.
Figure 11B:
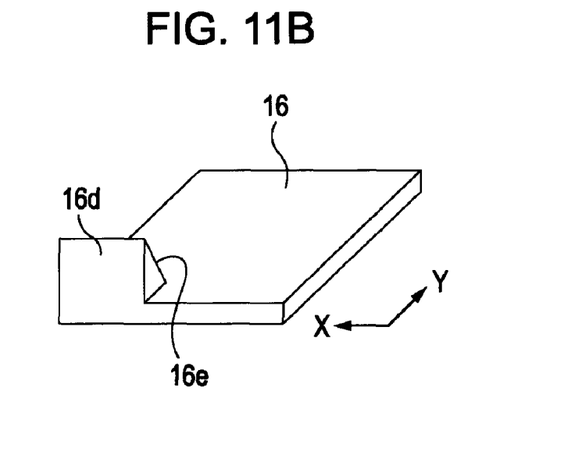
Figure 12:
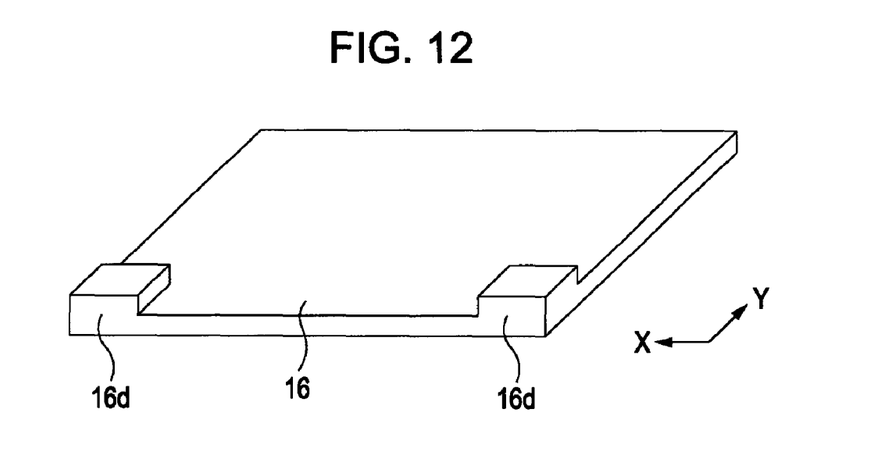
FIG. 12 is a diagram illustrating another example of the shape of the shield layers according to an embodiment of the present invention.

Each of the lower shield layer 13 and the upper shield layer 16 has a relatively thick edge portion. The edge portion may be shaped as shown in FIGS. 11A, 11B, and 12. Although the upper shield layer 16 is shown in the figures as an example, the lower shield layer 13 may also have a similar structure. For example, the edge portion may be a block-shaped thick portion 16d, as shown in FIG. 11A. Alternatively, as shown in FIG. 11B, the edge portion may be a thick portion 16d having a surface that is inclined inward in the height direction (toward the inside from the medium-facing surface). More specifically, the thick portion 16d may have a slope 16e such that the thickness of the thick portion 16d is reduced toward the inside in the height direction.

When an external magnetic field is applied to the magnetic head apparatus in a planar direction (height direction), the magnetic layers are magnetized and generate magnetic fields at edges thereof. At this time, the return yoke layer and the lower shield layer generate the largest magnetic fields (planar-direction components) at the edges thereof. This leads to a phenomenon in which overwriting occurs and existing information is deleted (edge writing). The magnetic fields generated at the edges can be reduced by increasing the volumes around the edges and reducing the magnetic flux density around the edges, and have made the embodiments of the present invention based on this discovery.

According to embodiments of the present invention, the edge portion of each shield layer is shaped such that the volume of the return yoke layer is increased at the edge portion. For example, the edge portion has a relatively large thickness. Accordingly, the magnetic flux density around the edge is reduced, so that the edge-write magnetic field is suppressed and the external magnetic field resistance is increased.

According to embodiments of the present invention, a shield layer having the edge portion as described above is used as one or both of the shield layers for shielding the read element 14 exposed at the medium-facing surface, that is, one or both of the upper shield layer 16 and the lower shield layer 13. In an exemplary embodiment, a Current In Plane (CIP) structure is described in which the read element 14 applies a current in a direction parallel to the layer surfaces. In other words, the inorganic insulating layer 15 including the read element 14 is interposed between a pair of shield layers. However, embodiments of the present invention may also be applied to a Current-Perpendicular-to-Plane (CPP) structure in which the read element 14 applies a current in a direction perpendicular to the layer surfaces, that is, in which the shield layers are used also as current lead layers and are in contact with the read element.

Figure 13A:
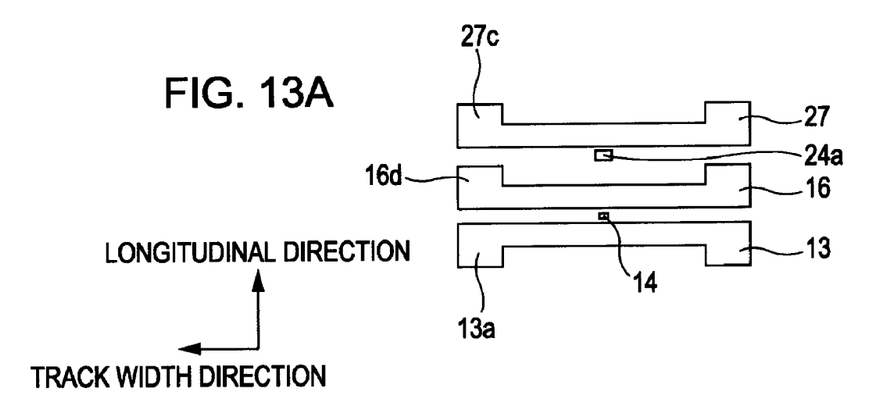
FIGS. 13A to 13D are diagrams illustrating examples of the structures including an upper shield layer, a lower shield layer, and a return yoke layer which each include edge portions.
Figure 13B:
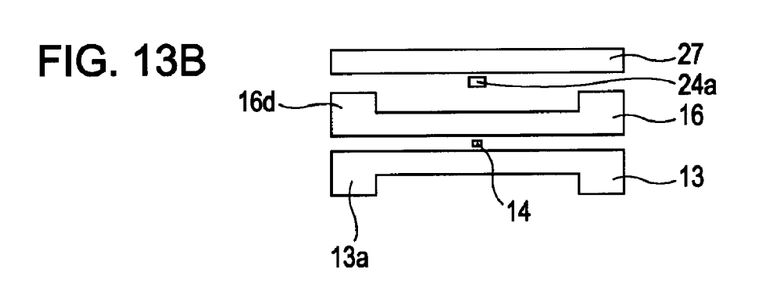

In the case in which each of the shield layers has edge portions in a cross section along the height direction, each of the edge portions may be formed so as to protrude in a direction away from the insulating layer 15. More specifically, as shown in FIGS. 13A and 13B, the edge portions 16d of the upper shield layer 16 may be formed so as to protrude (project) upward, and the edge portions 13a of the lower shield layer 13 are formed so as to protrude (project) downward. This structure is advantageous from the viewpoint of manufacturing.

Figure 13C:
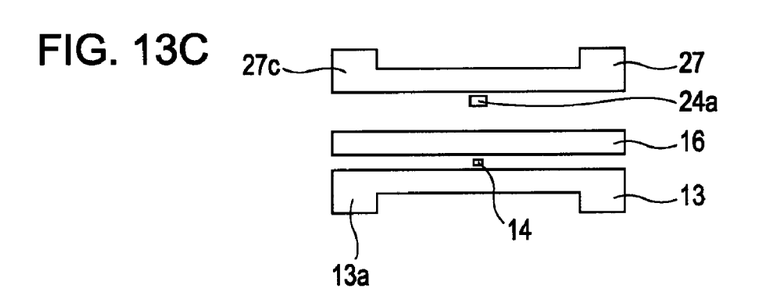
Figure 13D:
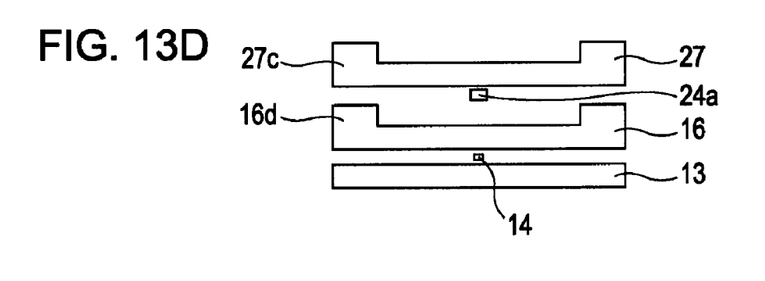

In addition to the lower shield layer 13 and the upper shield layer 16, the return yoke layer 27 may also have the above-described edge portions. In the case in which each of the lower shield layer 13, the upper shield layer 16, and the return yoke layer 27 has the relatively thick edge portions, the structures shown in FIGS. 13A to 13D may be adopted. More specifically, in the structure shown in FIG. 13A, the edge portions 13a of the lower shield layer 13 protrude (project) downward, the edge portions 16d of the upper shield layer 16 protrude (project) upward, and the edge portions 27c of the return yoke layer 27 protrude (project) upward. In the structure shown in FIG. 13B, the edge portions 13a of the lower shield layer 13 protrude (project) downward, the edge portions 16d of the upper shield layer 16 protrude (project) upward, and the return yoke layer 27 is thin-plate shaped. In the structure shown in FIG. 13C, the edge portions 13a of the lower shield layer 13 protrude (project) downward, the upper shield layer 16 is thin-plate shaped, and the edge portions 27c of the return yoke layer 27 protrude (project) upward. In the structure shown in FIG. 13D, the lower shield layer 13 is thin-plate shaped, the edge portions 16d of the upper shield layer 16 protrude (project) upward, and the edge portions 27c of the return yoke layer 27 protrude (project) upward. However, the embodiments of present invention are not limited to the above-described structures, and various modifications can be made. For example, although a single thin-plate shaped layer is provided in the above-described structures, two thin-plate-shaped layers may also be included.

Since the return yoke layer also has the edge portions, the PTP phenomenon can be more effectively suppressed while reducing the edge-write magnetic field so as to increase the external magnetic field resistance. The edge portion of the return yoke layer 27 may also have shapes shown in FIGS. 11A, 11B, and 12.

Figure 14:
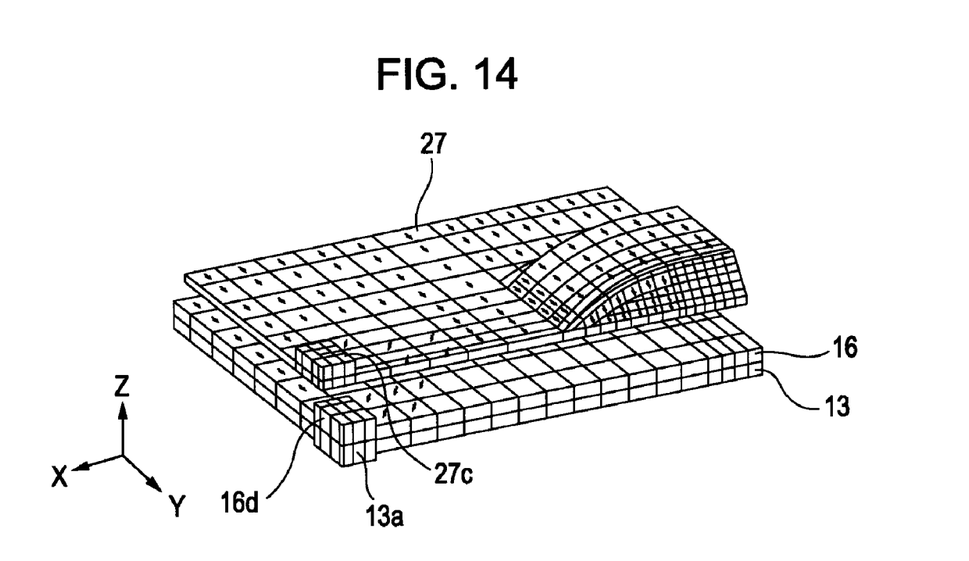
FIG. 14 is a diagram illustrating the magnetization directions in the structure in which each of the upper shield layer, the lower shield layer, and the return yoke layer has edge portions.

In the shield layers 13 and 16 and the return yoke layer 27 of the perpendicular magnetic recording/reproducing head, when the external magnetic field is applied, magnetization of the magnetic bodies concentrates at the edges. Therefore, by forming the relatively thick edge portions on the shield layers 13 and 16 and the return yoke layer 27, directions in which the magnetic thin films cannot be easily magnetized can be generated. Accordingly, as shown in FIG. 14, the magnetic field component in the height direction can be reduced. As a result, the edge-write magnetic field is suppressed and the external magnetic field resistance is increased.

Figure 15A:
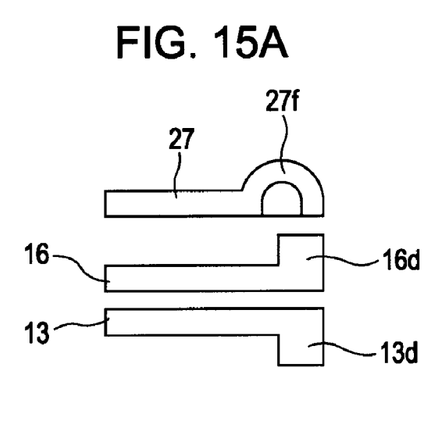
FIGS. 15A and 15B are diagrams illustrating other examples of the structures including the upper shield layer, the lower shield layer, and the return yoke layer.
Figure 15B:
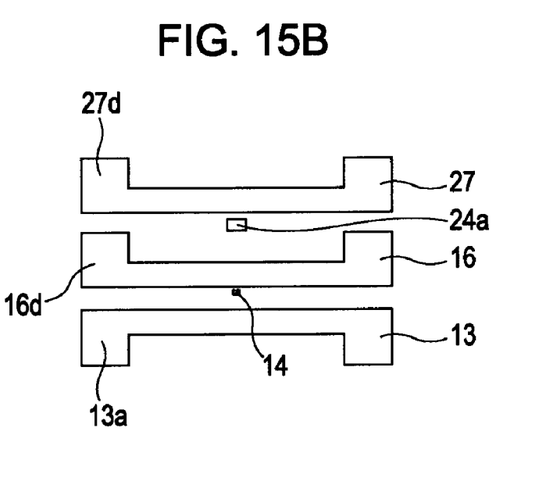
Figure 16:
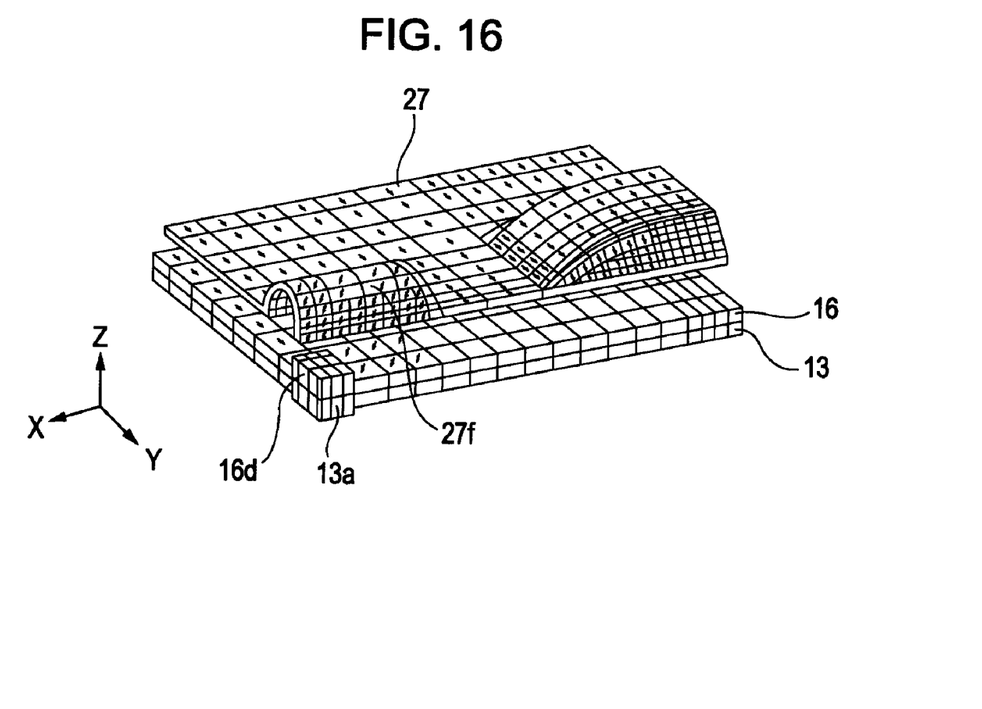
FIG. 16 is a diagram illustrating the magnetization directions in the structure in which each of the upper shield layer and the lower shield layer has the edge portions and the return yoke layer has arch portions.

With regard to the return yoke layer 27, as shown in FIGS. 15A and 15B, an arch portion 27f having an arch shape may also be provided instated of the edge portion 27c. More specifically, the structure in which the edge portion 13a of the lower shield layer 13 protrudes (projects) downward, the edge portion 16d of the upper shield layer 16 protrudes (projects) upward, and the arch portion 27f of the return yoke layer 27 protrudes (projects) upward may also be adopted. Accordingly, the magnetic field component in the height direction can be more effectively reduced, so that the edge-write magnetic field can be suppressed and the external magnetic field resistance can be increased. Thus, also in this case, the magnetic field component in the height direction can be reduced, as shown in FIG. 16. As a result, the edge-write magnetic field is suppressed and the external magnetic field resistance is increased.

A method for manufacturing the perpendicular magnetic recording/reproducing head including the above-described shield layers will be described below. In the case in which the edge portions are provided on the return yoke layer in addition to the shield layers, the above-described manufacturing method can be applied. More specifically, a resist layer is formed on the gap layer including the coil insulating base layer and the upper coil pieces, a return yoke layer is formed on the resist layer by plating, and then the thick portions are formed on the return yoke layer at the edges thereof by performing additional plating. When the return yoke layer having the arch portion as shown in FIG. 15 is formed, a first resist layer is formed on the gap layer including the coil insulating base layer and the upper coil pieces, a second resist layer is formed in an area where the arch portion is to be formed, and then the return yoke layer is formed on the second resist layer by plating. Thus, the return yoke layer is formed in an arch shape along the second resist layer.

To obtain the structure shown in FIG. 13A, first, a nonmagnetic insulating layer having recesses for the edge portions of the lower shield layer 13 is formed on the slider. The nonmagnetic insulating layer is obtained by forming a pattern by a known photolithography process or etching. Then, the recesses are filled with a shield material by plating and the shield material is polished by a Chemical Mechanical Polishing (CMP) process to obtain a flat surface. Thus, the lower shield layer 13 is formed. Then, the inorganic insulating layer 15 is formed on the lower shield layer 13. The inorganic insulating layer 15 functions as a lead gap together with another insulating layer. The inorganic insulating layer 15 is formed by sputtering an inorganic insulating material on the lower shield layer 13.

Next, the upper shield layer 16 having the relatively thick edge portions 16d is formed on the inorganic insulating layer 15. More specifically, first, the upper shield layer 16 is formed on the inorganic insulating layer 15 by plating, and then the thick edge portions 16d are formed on the upper shield layer 16. The thick edge portions 16d are formed on the upper shield layer 16 by performing additional plating. Thus, the relatively thick edge portions are formed.

Accordingly, a shield layer region including the upper shield layer 16 and the lower shield layer 13 which each have the edge portions is manufactured. In the edge portions of the thus-manufactured perpendicular magnetic recording/reproducing head, the external magnetic field is applied in the direction in which the edge portions are not easily magnetized. Therefore, the magnetic bodies are not easily magnetized and magnetic fields are reduced. Therefore, even when the shield layers are relatively thin, the edge-write magnetic field is suppressed and the external magnetic field resistance is increased.

Simulations performed to clarify the effects of embodiments of the present invention will be described below. Similar to the static magnetic field simulation performed in the first embodiment, the maximum magnetic field strength was high when the length w of the thick portion in the track width direction was small, and was reduced to a lower limit when the length w was equal to or more than a certain length. Therefore, the length of the edge portion in the track width direction is approximately 4 µm or more. In addition, as the length w of the thick portion is increased, the amount of projection at the edge portion is increased. However, the amount of projection of the element at the central position is constant irrespective of the length w of the thick portion in the track width direction, and the influence of the length w of the thick portion is small. In addition, in a magnetic head apparatus that is free from the thick portion, the amount of projection is largest at the central position in the track width direction. Accordingly, similar to the first embodiment, the length w of the thick portion is approximately 10 µm or less, so that the amount of projection at the edge position does not exceed the amount of projection at the central position.

In addition, the maximum magnetic field obtained in the magnetic head apparatus was determined for the cases in which the perpendicular magnetic recording/reproducing head has the structure shown in FIG. 13A (first example) and the structure shown in FIG. 15A (second example). In the structure shown in FIG. 13A (first example), the edge portions 13a of the lower shield layer 13 protrude downward, the edge portions 16d of the upper shield layer 16 protrude upward, and the edge portions 27c of the return yoke layer 27 protrude upward. In the structure shown in FIG. 15A (second example), the edge portion 13a of the lower shield layer 13 protrudes downward, the edge portion 16d of the upper shield layer 16 protrudes upward, and the arch portion 27f of the return yoke layer 27 protrudes upward. The results of the simulations are shown in FIG. 17.

For comparison, similarly, the maximum magnetic field strength obtained in a magnetic head apparatus including a perpendicular magnetic recording/reproducing head was also determined for the case in which the thickness of the upper shield layer is 1.6 µm, the thickness of the lower shield layer is 1.2 µm, the thickness of the return yoke layer is 0.5 µm, and the upper shield layer, the lower shield layer, and the return yoke layer are free from the edge portion or the arch portion. The result of this simulation is also shown in FIG. 17.

Figure 17:
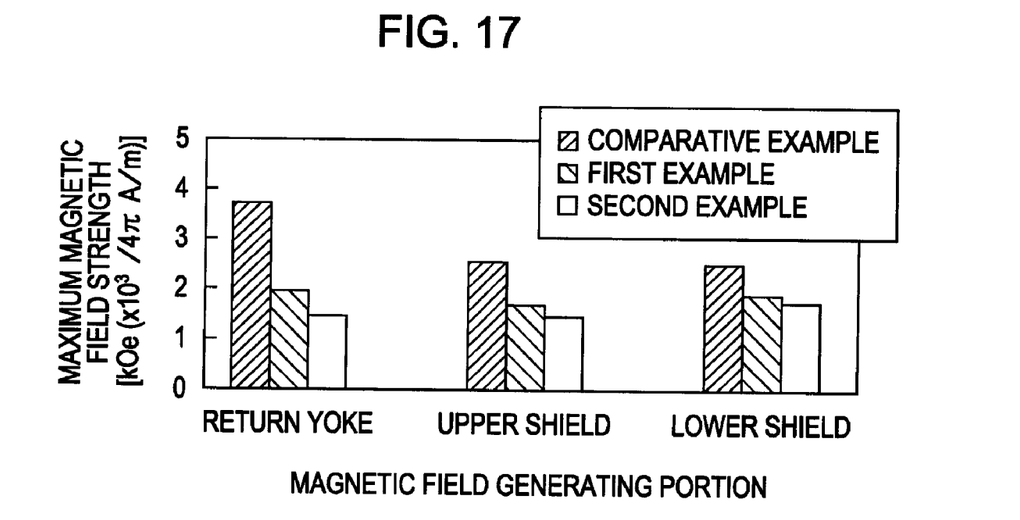
FIG. 17 is a diagram illustrating the characteristic of a perpendicular magnetic recording/reproducing head according to an embodiment of the present invention.

As is clear from FIG. 17, the maximum magnetic field strength obtained in the magnetic head apparatus including the perpendicular magnetic recording/reproducing head according to embodiments of the present invention was 2 kOe ($\times 10^3/4\pi$A/m) or less. Thus, the external magnetic field resistance is increased. In particular, the external magnetic field resistance is considerably increased in the case in which the return yoke layer has the arch portion (second example). In comparison, in the magnetic head apparatus including the perpendicular magnetic recording/reproducing head having the upper shield layer, the lower shield layer, and the return yoke layer that are free from the edge portion or the arch portion (comparative example), the maximum magnetic field strength was about 3 to 4 kOe ($\times 10^3/4\pi$A/m). Therefore, edge writing occurs depending on the coercive force of the medium on which information is recorded.

The present invention is not limited to the above-described embodiments, and various modifications are possible. Fore example, numerical values and materials are not limited to those described above in the embodiments. In addition, processes are not limited to those described above in the embodiments, and the order in which the processes are performed may also be changed. Various changes and modifications can be made within the scope of the present invention.

What is claimed is:

1. A perpendicular magnetic recording head comprising:
a first magnetic layer having a main magnetic pole exposed at a medium-facing surface that faces a recording medium;
a second magnetic layer that faces the first magnetic layer with a nonmagnetic layer interposed therebetween; and
a coil layer for applying a recording magnetic field to the first magnetic layer,
wherein the second magnetic layer includes a thick edge portion; and
wherein a length of the edge portion in a track width direction is in the range of approximately 4 µm to 10 µm.

2. The perpendicular magnetic recording head according to claim 1, wherein the edge portion is positioned to be exposed at the medium-facing surface.

3. A perpendicular magnetic recording/reproducing head comprising:
a read element exposed at a medium-facing surface that faces a recording medium;
a pair of shield layers that shield the read element;
a magnetic layer having a main magnetic pole exposed at the medium-facing surface that faces the recording medium;
a return yoke layer that faces the magnetic layer with a nonmagnetic layer interposed therebetween; and
a coil layer for applying a recording magnetic field to the magnetic layer and the return yoke layer,
wherein at least one of the pair of shield layers includes a thick edge portion, and
wherein each of the pair of shield layers includes the edge portion, the edge portion protruding in a direction away from an insulating layer in a cross section along a height direction.

4. The perpendicular magnetic recording/reproducing head according to claim 3, wherein the edge portion is positioned to be exposed at the medium-facing surface.

5. The perpendicular magnetic recording/reproducing head according to claim 3, wherein a length of the edge portion in a track width direction is in the range of approximately 4 µm to 10 µm.

* * * * *